United States Patent
Sannino et al.

(10) Patent No.: US 6,587,308 B2
(45) Date of Patent: Jul. 1, 2003

(54) DISC HEAD SLIDER HAVING PROFILED CONVERGENT CHANNEL FEATURES

(75) Inventors: Anthony P. Sannino, Longmont, CO (US); Thomas R. Pitchford, Bloomington, MN (US); Zine-Eddine Boutaghou, Vadnais Heights, MN (US); Scott E. Ryun, Prior Lake, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/945,919

(22) Filed: Sep. 4, 2001

(65) Prior Publication Data

US 2002/0063995 A1 May 30, 2002

Related U.S. Application Data

(63) Continuation-in-part of application No. 09/398,993, filed on Sep. 17, 1999.
(60) Provisional application No. 60/230,752, filed on Sep. 7, 2000, and provisional application No. 60/117,724, filed on Jan. 29, 1999.

(51) Int. Cl.[7] .............................. G11B 5/60; G11B 21/21
(52) U.S. Cl. ................................ 360/236.3; 360/235.6; 360/235.7
(58) Field of Search .......................... 360/236.3, 235.4, 360/235.5, 235.6, 235.7, 237, 234.3

(56) References Cited

U.S. PATENT DOCUMENTS

| 4,212,044 A | 7/1980 | Plotto ........................ 360/103 |
| 4,218,715 A | 8/1980 | Garnier ...................... 360/103 |
| 4,553,184 A | 11/1985 | Ogishima .................. 360/103 |
| 4,636,894 A | 1/1987 | Mo ............................ 360/103 |
| 4,646,180 A * | 2/1987 | Ohtsubo ................... 360/236.6 |
| 4,757,402 A | 7/1988 | Mo ............................ 360/103 |
| 4,984,114 A | 1/1991 | Takeuchi et al. ............ 360/103 |
| 5,086,360 A | 2/1992 | Smith et al. ................ 360/103 |
| 5,128,822 A | 7/1992 | Chapin et al. .............. 360/103 |
| 5,200,868 A | 4/1993 | Chapin et al. .............. 360/103 |
| 5,218,494 A | 6/1993 | Chapin et al. .............. 360/103 |
| 5,218,495 A | 6/1993 | Chapin et al. .............. 360/103 |
| 5,317,465 A | 5/1994 | Chapin et al. .............. 360/103 |
| 5,343,343 A | 8/1994 | Chapin ....................... 360/103 |
| 5,359,480 A | 10/1994 | Nepela et al. .............. 360/103 |
| 5,430,591 A * | 7/1995 | Takeuchi et al. ........ 360/236.1 |
| 5,490,026 A | 2/1996 | Dorius et al. ............... 360/103 |
| 5,513,056 A | 4/1996 | Kawasaki et al. .......... 360/103 |

(List continued on next page.)

FOREIGN PATENT DOCUMENTS

| EP | 0 747 890 | 12/1996 |
| JP | 60-242548 | 2/1985 |
| JP | 1-211383 | 8/1989 |
| JP | 1-245480 | 9/1989 |
| JP | 1-319188 | 12/1989 |
| JP | 3-132981 | 6/1991 |
| WO | WO 86/03048 | 5/1986 |

*Primary Examiner*—William Korzuch
*Assistant Examiner*—Angel Castro
(74) *Attorney, Agent, or Firm*—Westman, Champlin & Kelly

(57) ABSTRACT

A disc head slider is provided, which includes a slider body having a disc-opposing face with leading and trailing slider edges and a slider length measured between the leading and trailing slider edges. The disc-opposing face has a bearing surface and a recessed area which is recessed from the bearing surface. A convergent channel is recessed within the bearing surface and has a leading channel end open to fluid flow from the recessed area, channel side walls, a trailing channel end closed to the fluid flow, and a channel length measured between the leading and trailing channel ends. The trailing channel end is located rearward of a midpoint along the slider length and the channel floor is vertically contoured relative to the bearing surface along at least a portion of the channel length.

18 Claims, 6 Drawing Sheets

U.S. PATENT DOCUMENTS

| | | | |
|---|---|---|---|
| 5,515,219 A | 5/1996 | Ihrke et al. | 360/103 |
| 5,550,693 A | 8/1996 | Hendriks et al. | 360/103 |
| 5,624,581 A | 4/1997 | Ihrke et al. | 216/22 |
| 5,636,085 A | 6/1997 | Jones et al. | 360/103 |
| 5,737,151 A | 4/1998 | Bolasna et al. | 360/103 |
| 5,751,517 A | 5/1998 | Agarwal | 360/103 |
| 5,761,004 A | 6/1998 | Peck | 360/103 |
| 5,796,551 A | 8/1998 | Samuelson | 360/103 |
| 5,953,181 A | 9/1999 | Utsunomiya | 360/103 |
| 5,963,396 A | 10/1999 | Burga et al. | 360/103 |
| 5,973,881 A | 10/1999 | Ajiki | 360/103 |
| 6,040,965 A * | 3/2000 | Terunuma et al. | 360/122 |
| 6,055,129 A * | 4/2000 | Park et al. | 360/236.1 |
| 6,188,547 B1 | 2/2001 | Gui et al. | 360/236.5 |
| 6,198,600 B1 * | 3/2001 | Kitao et al. | 360/235.2 |
| 6,229,671 B1 | 5/2001 | Boutaghou et al. | 360/235.1 |
| 6,236,543 B1 | 5/2001 | Han et al. | 360/236.6 |

* cited by examiner

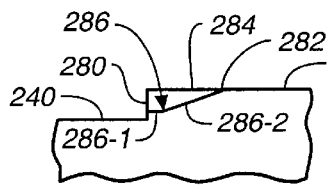
FIG._5-1
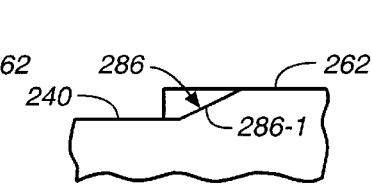
FIG._5-2
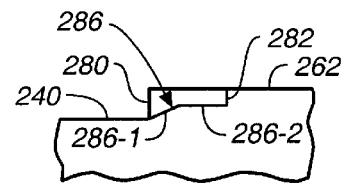
FIG._5-3
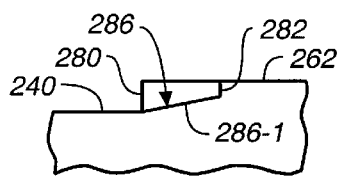
FIG._5-4
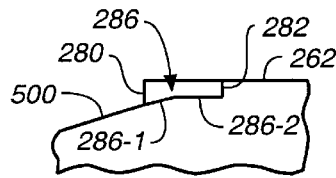
FIG._5-5
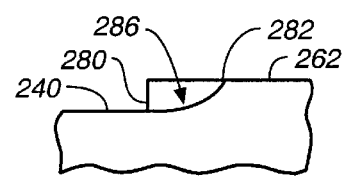
FIG._5-6
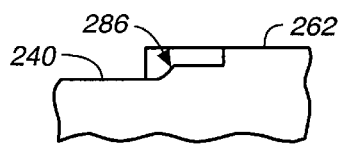
FIG._5-7
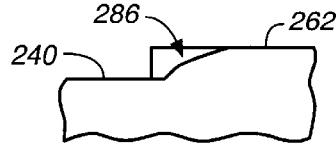
FIG._5-8
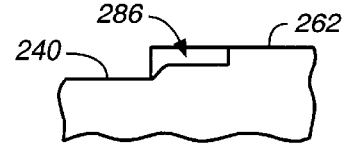
FIG._5-9
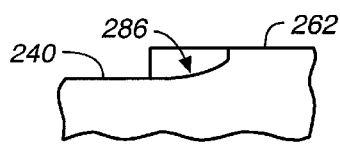
FIG._5-10
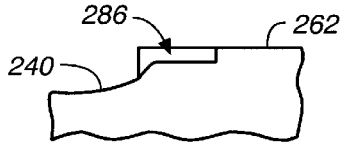
FIG._5-11
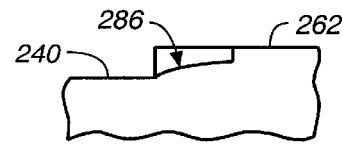
FIG._5-12
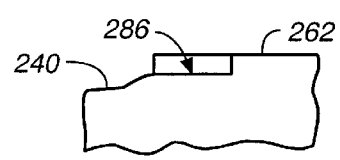
FIG._5-13
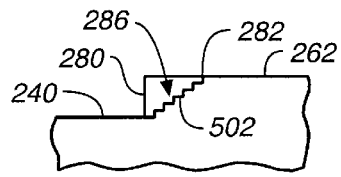
FIG._5-14

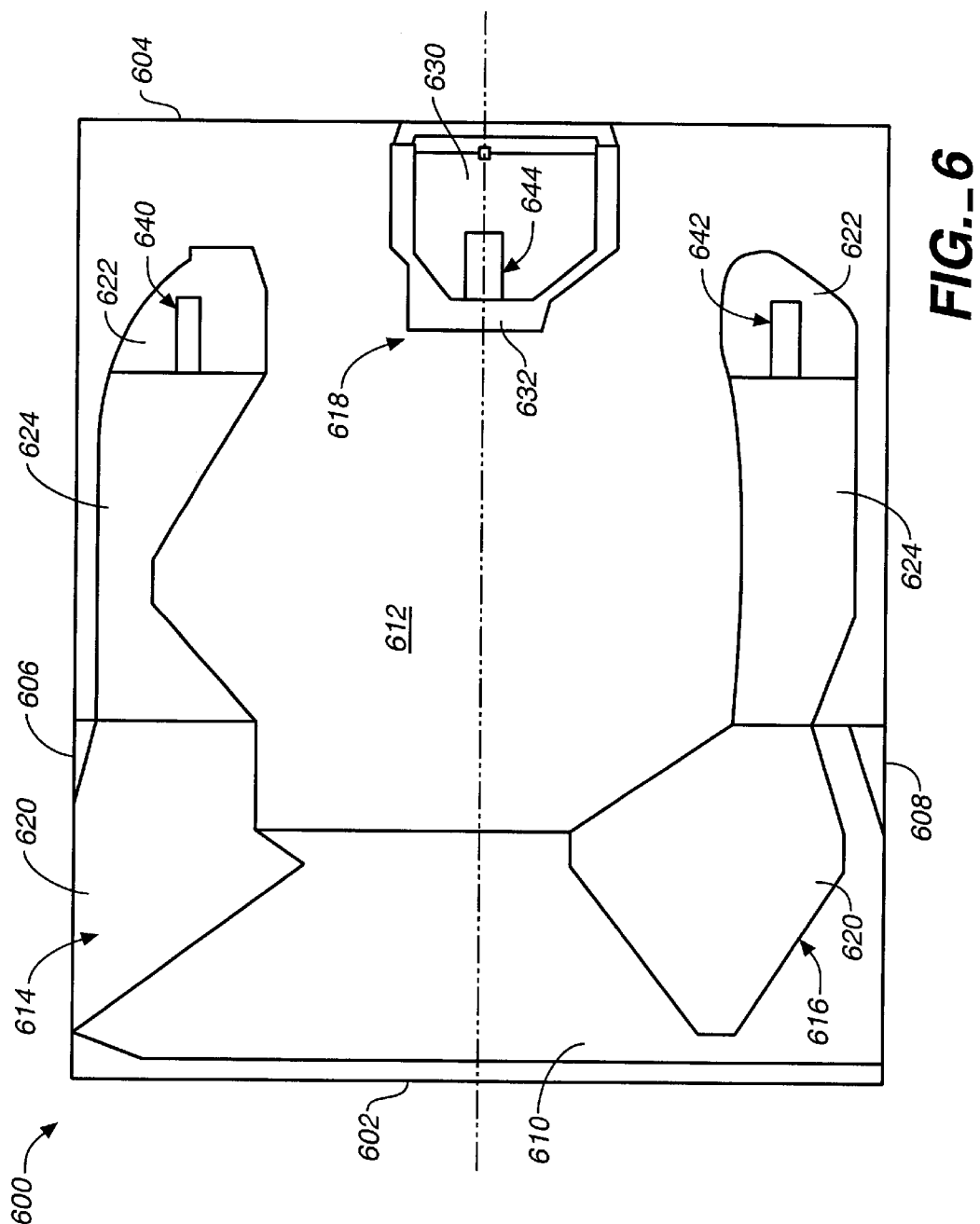
FIG._6

DISC HEAD SLIDER HAVING PROFILED CONVERGENT CHANNEL FEATURES

CROSS-REFERENCE TO RELATED APPLICATIONS

This application claims the benefit of U.S. Provisional Application Ser. No. 60/230,752, entitled "TAPERED/PROFILED TRENCHED AAB FOR INCREASED CONTACT STIFFNESS AND ENHANCED TAKE-OFF PERFORMANCE," filed Sep. 7, 2000, and is a continuation-in-part of U.S. application Ser. No. 09/398,993, filed Sep. 17, 1999, which is a non-provisional of U.S. Provisional Application Ser. No. 60/117,724, filed Jan. 29, 1999.

FIELD OF THE INVENTION

The present invention relates to data storage systems and, more particularly, to a disc head slider for communicating with a recording medium.

BACKGROUND OF THE INVENTION

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a relatively high pitch stiffness.

The bearing clearance between the slider and the disc surface at the recording head is an important parameter to disc drive performance. As average flying heights continue to be reduced, it is important to control several metrics of flying height performance, such as flying height sensitivity to process variations, take-off performance and vibration damping capability.

Fly height loss due to manufacturing process variations has been observed to be an increasing source of intermittent head/media contact, as flying heights continue to be reduced, especially at sub half-microinch flying heights. Intermittent contact induces vibrations that are detrimental to reading and writing quality at such low flying heights. In addition, the ability of the air bearing to dampen vibrations and provide good take-off performance has been shown to be a critical factor in enabling sub half-microinch flying heights.

Slider air bearings possess three degrees of freedom, vertical motion, pitch rotation and roll rotation. These three degrees of freedom are associated with three applied forces, which include the preload force imposed by the load beam and the suction and lift forces developed by the air bearing. A steady-state flying attitude is achieved when these three forces balance each other.

At the steady-state flying attitude, the fluid bearing possesses intrinsic stiffnesses with respect to its three degrees of freedom. These stiffnesses are referred to as vertical, pitch and roll stiffness. In addition, contact stiffness is defined as a vectorial combination of the slider pitch stiffness and the slider vertical stiffness. Contact stiffness characterizes the vertical stiffness of the slider at the particular location of the pole tip. Contact stiffness, Kc, is defined as:

$$Kc = \frac{Kp}{\frac{Kp}{Kz} + b^2} \qquad \text{EQ. 1}$$

where "Kp" is the pitch stiffness, "Kz" is the vertical stiffness and "b" is the distance between the slider pivot point and the pole tip.

Manufacturing variations can cause variations in the pitch static angle (PSA) or the preload force, which impose variations in the slider flying attitude. However, increasing the pitch stiffness and vertical stiffness of the air bearing results in a larger resistance to variations in the slider's flying attitude. An increase in pitch and vertical stiffness can be achieved by generating more suction and lift force per unit area of the air bearing.

In general, contact stiffness (or "local pole tip stiffness") is related to the amount of lift and suction force located at the vicinity of the pole tip, which is typically near the trailing edge of the slider. Therefore, moving the center of suction within the cavity closer to the pole tip can result in higher contact stiffness. The center of suction can be moved toward the trailing edge by reducing the depth of the cavity, increasing the depth of the "step" surfaces, or lowering the cavity/step depth ratio to produce a suction force that is more spread within the cavity. Increasing the cavity/step ratio has the tendency to create the center of suction closer to the cavity dam.

Also, at a given pitch angle, an increase in linear velocity will tend to spread the suction force within the cavity, thus moving the center of suction towards the trailing edge. This suggests interaction of two parameters on the location of the center of suction: (1) linear velocity; and (2) cavity/step depth ratio. Designing an air bearing for higher suction towards the pole tip can therefore include selecting the correct cavity/step depth ratio at a given linear velocity, which is dictated by the spindle speed and radius configuration of the disc drive. However, moving the center of suction towards the pole tip has been shown to compromise take-off performance, which degrades contact start-stop performance.

Another concept that has been proposed for increasing suction force near the pole tip is a "suction at trailing edge air bearing", which can be achieved by moving the location of the cavity toward the trailing edge. However, this design does not fully utilize the large surface area on the slider located near the leading edge. This results in a loss of real estate that could have been utilized to increase suction and lift forces, which is known to increase air bearing stiffness and further decrease sensitivity to manufacturing process variations.

Improved slider bearings are therefore desired which minimize sensitivity of the slider to manufacturing variations by increasing contact stiffness while also enhancing take-off performance and improving damping capability of the slider.

SUMMARY OF THE INVENTION

One embodiment of the present invention is directed to a disc head slider, which includes a slider body having a disc-opposing face with leading and trailing slider edges and a slider length measured between the leading and trailing slider edges. The disc-opposing face has a bearing surface and a recessed area which is recessed from the bearing surface. A convergent channel is recessed within the bearing surface and has a leading channel end open to fluid flow from the recessed area, channel side walls, a trailing channel end closed to the fluid flow, and a channel length measured between the leading and trailing channel ends. The trailing channel end is located rearward of a midpoint along the slider length and the channel floor is vertically contoured relative to the bearing surface along at least a portion of the channel length.

Another embodiment of the present invention is directed to a disc drive assembly which includes a disc rotatable about a central axis and a slider supported over the disc. The slider includes a slider body having a disc-opposing face with leading and trailing slider edges and a slider length measured between the leading and trailing slider edges. The disc-opposing face has a bearing surface and a recessed area which is recessed from the bearing surface. A convergent channel is recessed within the bearing surface and has a leading channel end open to fluid flow from the recessed area, channel side walls, a trailing channel end closed to the fluid flow, and a channel length measured between the leading and trailing channel ends. The trailing channel end is located rearward of a midpoint along the slider length and the channel floor is vertically contoured relative to the bearing surface along at least a portion of the channel length.

Yet another embodiment of the present invention is directed to a disc head slider, which includes a disc opposing face having a bearing surface and a vertically contoured convergent channel for generating a positive pressure gradient along the bearing surface.

BRIEF DESCRIPTION OF THE DRAWINGS

FIGS. 5-1 through 5-14 are fragmentary, cross sectional views of a convergent channel taken along lines 5—5 of FIG. 2, which illustrate various taper profiles according to alternative embodiments of the present invention.

FIG. 6 is a bottom plan view of a slider having vertically-contoured convergent channels according to an alternative embodiment of the present invention.

DETAILED DESCRIPTION OF ILLUSTRATIVE EMBODIMENTS

Figure 1:
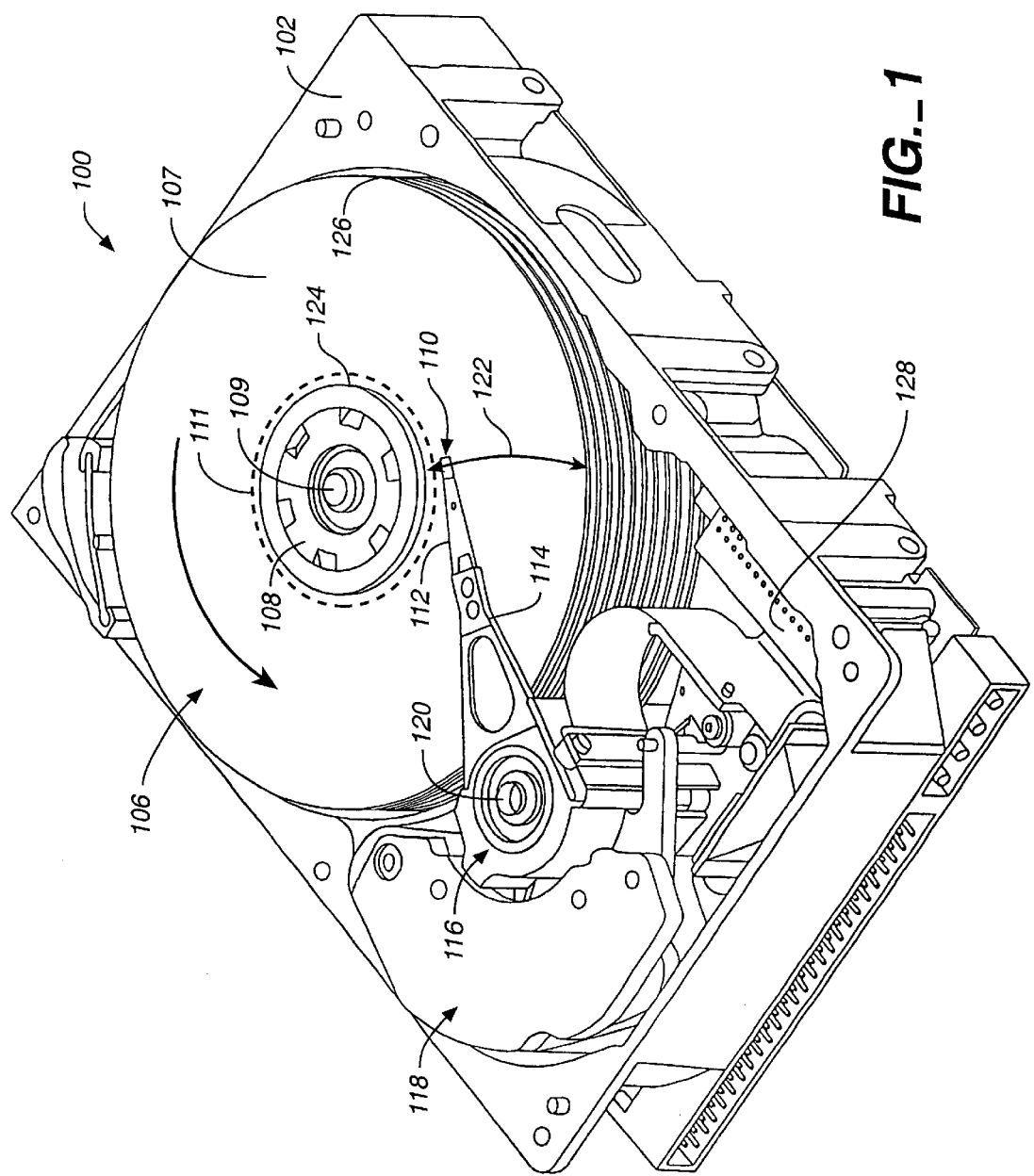
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing that provides increased contact stiffness, enhanced take-off performance and increased vibration damping capability. The increased contact stiffness reduces the flying attitude sensitivity of slider 110 to manufacturing tolerances. Enhanced take-off performance is achieved by producing greater pressurization at low spindle speeds, and increased damping capability is achieved by increasing pressurization efficiency and increasing pressure gradients developed near the slider's trailing edge where the read and write transducer is located.

Figure 2:
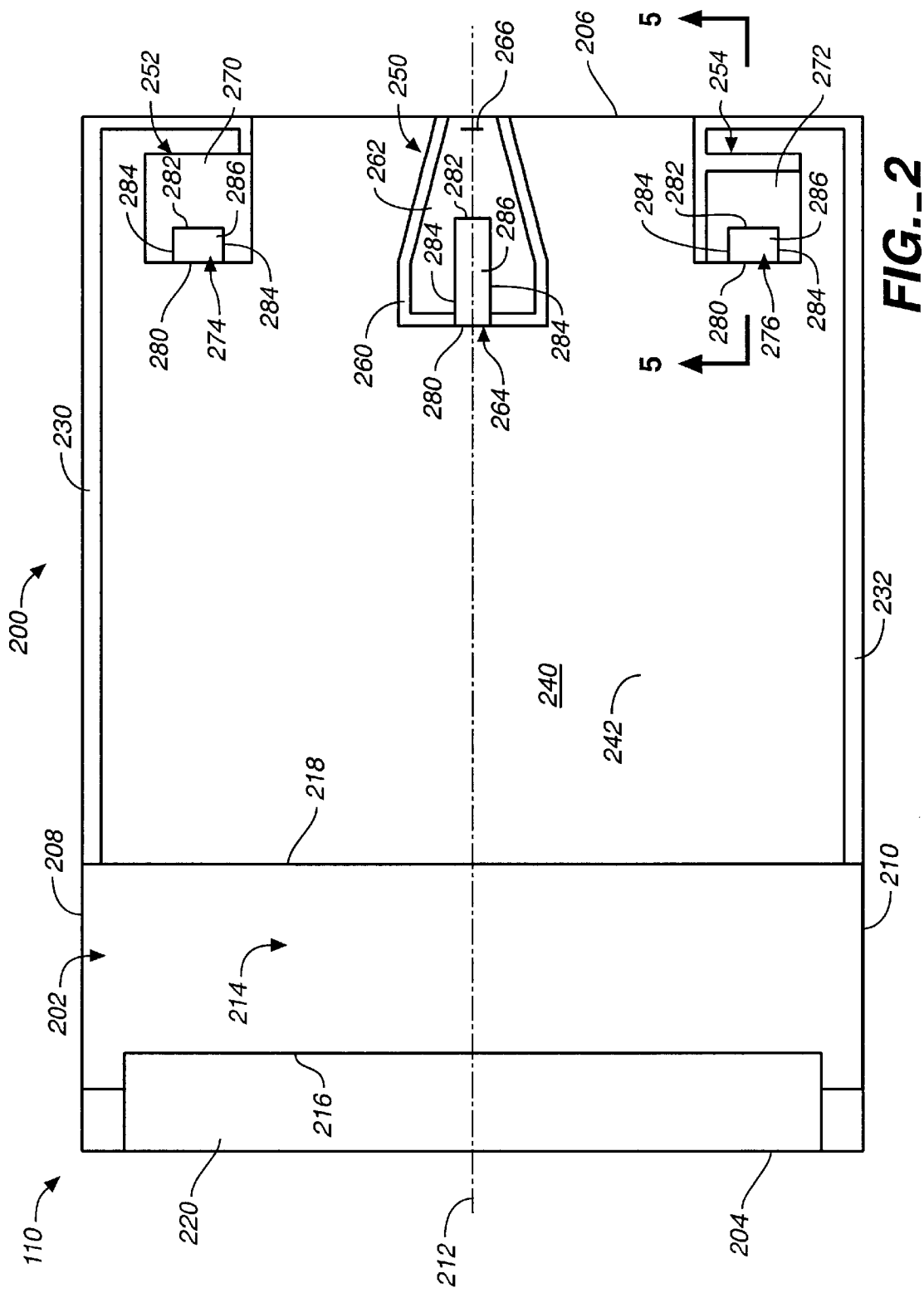
FIG. 2 is a bottom plan view of a slider having vertically-contoured convergent channels within the disc drive of FIG. 1, as viewed from the surface of a disc.
Figure 3:
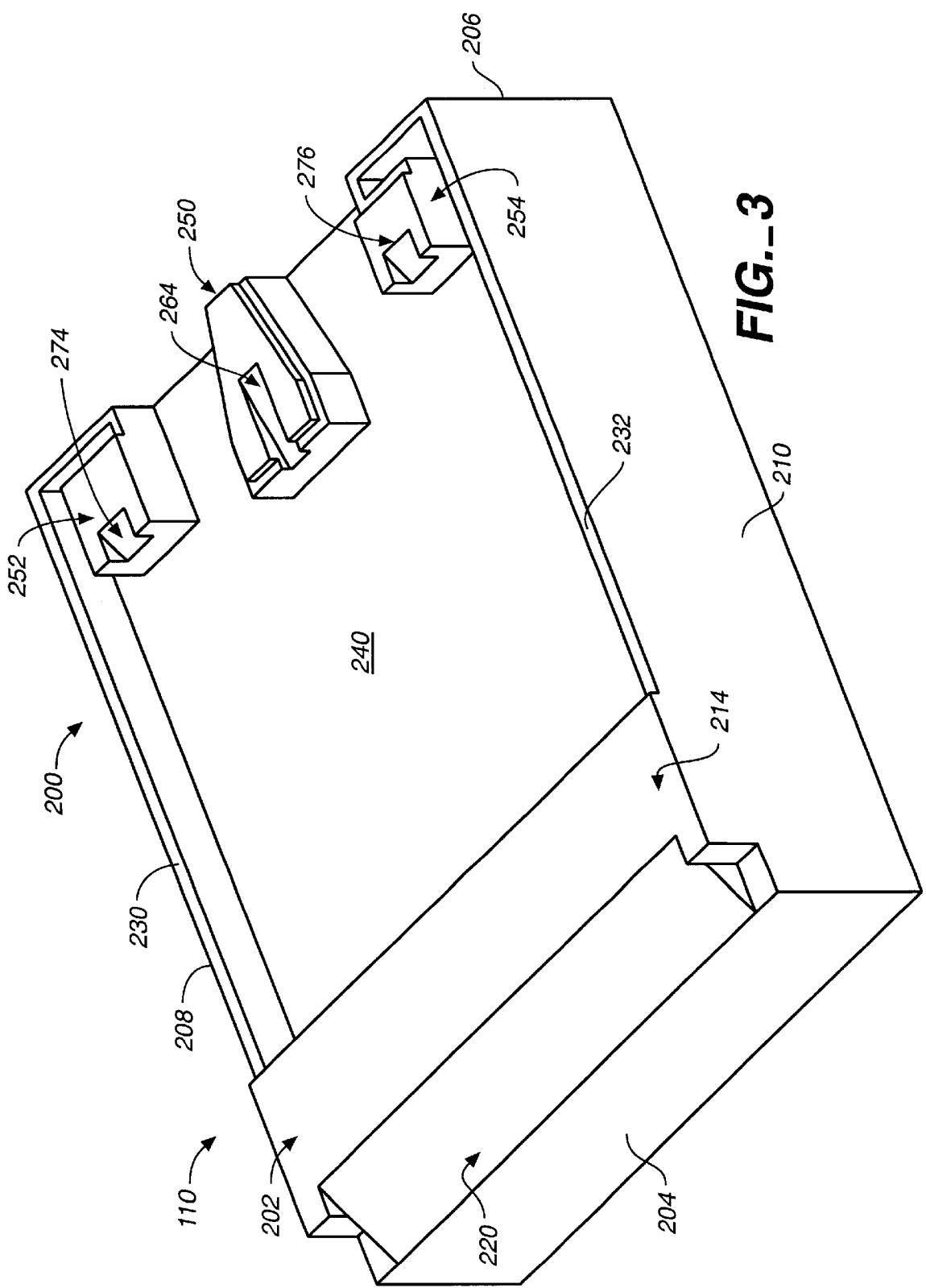
FIG. 3 is a bottom, perspective view of the slider shown in FIG. 2.

FIG. 2 is a bottom plan view of one of the sliders 110 of FIG. 1, as viewed from the surface of disc 107. FIG. 3 is a bottom, perspective view of slider 110. Slider 110 has a disc-opposing face 200, which defines a hydrodynamic (e.g., air) bearing surface 202. Bearing surface 202 is a reference level for disc opposing face 200. Disc-opposing face 200 includes a leading slider edge 204, a trailing slider edge 206, slider side edges 208 and 210, and a lateral center line 212. A cavity dam 214 extends between side edges 208 and 210, generally along leading slider edge 204. In one embodiment, the upper surface of cavity dam 214 is generally coplanar with and defines a portion of bearing surface 202. Cavity dam 214 has a leading edge 216 and a trailing edge 218.

A leading taper 220 is formed along the leading edge 216 of cavity dam 214. Leading taper 220 has a depth relative to bearing surface 202 that gradually decreases from leading slider edge 204 to the leading edge 216 of cavity dam 214.

In an alternative embodiment, leading taper 220 is a "stepped" taper having a substantially constant step depth of about 0.1 microns to about 0.3 microns relative to bearing surface 202, for example. Leading taper 220 can be formed by any method, such as ion milling, reactive ion etching (RIE) or lapping. In one embodiment, leading taper 220 is formed by ion milling through a gray scale photolithography mask that allows multiple depths to be etched with a single mask. Other methods can also be used. Leading taper 220 serves to pressurize air as the air is dragged under slider 110 by the disc surface. An additional effect of leading taper 216 is to create a first peak near leading edge 204 in the pressure distribution under slider 110 due to a high compression angle of the taper.

A first border wall 230 is positioned along slider side edge 208, and a second border wall 232 is positioned along slider side edge 210. Border walls 230 and 232 extend from cavity dam 214 to trailing slider edge 206. In one embodiment, border walls 230 an 232 have upper surfaces that are recessed from bearing surface 202 by the step depth of approximately 0.1 microns to approximately 0.3 microns and have a width of approximately 10 microns to approximately 100 microns.

A subambient pressure cavity 240 is defined between cavity dam 214 and border walls 230 and 232. Subambient pressure cavity 240 is a recessed area having a cavity floor 242 which is recessed from bearing surface 202 by a cavity depth, which is greater than the step depth. In one embodiment, cavity depth 242 is in the range of about 1 micron to about 3 microns. Other depths can also be used.

Subambient pressure cavity 240 trails cavity dam 214 relative to a direction of air flow from leading slider edge 204 toward trailing slider edge 206. Border walls 230 and 232 are very narrow so as to maximize the area of subambient pressure cavity 240 and thus the amount of suction force developed within the cavity while still serving the define the cavity and isolate the cavity from ambient pressure along slider side edges 208 and 210. Border walls 230 and 232 are recessed slightly relative to bearing surface 202 in order to allow for pressurization of bearing surface 202 when the air flow generated by the rotating disc is at skew with respect to lateral center line 212.

Slider 110 further includes an isolated center bearing pad 250 and isolated side bearing pads 252 and 254, which are positioned along trailing slider edge 206. Center pad 250 is positioned along lateral center line 212, and side pads 252 and 254 are positioned near slider side edges 208 and 210, respectively. In alternative embodiments, center pad 250 can be skewed or offset with respect to line 212.

Center pad 250 has leading and side step surfaces 260, bearing surface 262 and a vertically-contoured convergent channel feature (or "trench") 264. Bearing surface 262 is generally coplanar with the upper surface of cavity dam 214 and forms a part of bearing surface 202. Leading and side step surfaces 260 are generally parallel to and recessed from bearing surface 262 by the step depth of 0.1 to 0.3 microns, for example, for providing pressurization of bearing surface 262 from air flow venting from cavity 240. Center pad 250 supports a read/write transducer 266 along trailing slider edge 206. In alternative embodiments, transducer 266 can be positioned at other locations on slider 110. However, when placed at or near trailing slider edge 206, transducer 266 is located near the closest point on slider 110 to the surface of disc 107 (shown in FIG. 1) when slider 110 flies with a positive pitch angle. With a positive pitch angle, trailing slider edge 206 is closer to the surface of disc 107 than leading slider edge 204.

Similarly, side pads 252 and 254 include bearing surfaces 270 and 272 and vertically-contoured convergent channel features 274 and 276, respectively. Side pads 252 and 254 can also include leading and/or side step surfaces similar to center pad 250 in alternative embodiments. Bearing surfaces 270 and 272 are generally coplanar with the upper surface of cavity dam 214 and bearing surface 262 and also form a part of the overall bearing surface 202.

Channels 264, 274 and 276 each have a leading channel end (or "inlet") 280, a trailing channel end (or "outlet") 282, side walls 284 and a channel floor 286. Channels 264, 274 and 276 can also be formed through photolithography processes such as ion milling, chemical etching or reactive ion etching (RIE), for example. Alternatively, channels 264, 274 and 276 can be formed with pads 250, 252 and 254 through an additive process such as material deposition.

Channel floors 286 are vertically contoured relative to bearing surfaces 262, 270 and 272. In one embodiment channel floors 286 are tapered or otherwise vertically profiled so that the channel floors have a depth relative to bearing surfaces 262, 270 and 272 that progressively decreases along all or part of the length of the channel from leading channel end 280 to trailing channel end 282. The vertical profile can be linear, rectilinear, curved, curvilinear or a combination of these profiles. Also, a plurality of stepped surfaces can be used to approximate a taper along channel floors 286. Other vertically tapered profiles can also be used.

Leading channel ends 280 are open to fluid flow from subambient pressure cavity 240, and trailing channel ends 282 are closed to the fluid flow. During operation, the leading walls to either side of each channel 264, 274 and 276 present themselves as a substantial pressure rise to the local fluid flow. Since the opening to each channel, at leading channel ends 280, does not have the same pressure rise, it is seen as a preferential path for the fluid flow to travel. Once the fluid flow enters channels 264, 274 and 276, the flow is essentially bounded by channel side walls 284 and trailing channel end 282 and is forced to rise over trailing channel end 282, forming a "convergent" channel for the flow. This creates localized pressure areas at discrete regions on bearing surfaces 262, 270 and 272, just rearward of trailing channel ends 282. In one embodiment, these discrete regions have surfaces areas rearward of trailing channels ends 282 that are at least as long as the width of the channels, as measured between side walls 284. This provides sufficient surface area on which the localized pressure gradients can act. These channels can be symmetrical about lateral center line 212, as shown in FIG. 2, or can be asymmetrical to provide preferential pressurization at certain slider skew angles. Channel side walls 284 can be parallel to one another or non-parallel to one another.

The localized positive pressure gradients developed along bearing surfaces 262, 270 and 272 assist in providing pitch and roll stiffness to slider 110 and provide an energy dissipation mechanism during slider vibration, which dampens leading edge pitch and roll mode type vibrations at the slider's natural resonance frequencies. Leading edge pitch refers to rotation about a line near the leading edge of the slider, whereas trailing edge pitch refers to rotation about a line near the trailing edge of the slider. Roll mode type vibrations refer to rotation about the slider's longitudinal center line 212.

The amount of damping is proportional to the magnitude of the gradients that exist in the pressure field between slider 110 and the disc surface. The size and intensity of the localized positive pressure gradients depend on the channel length to width ratio, the absolute sizes of the channels, the depth and shape of the channel floors, and the height of the column of air between the channel floor and the disc surface. In one embodiment, the ratio of the channel lengths to the channel widths range from 0.5 to 5.0, but may vary outside that range depending on the design purposes of the channel feature. In another embodiment, the length to width ratio ranges from 2.0 to 2.5.

The localized positive pressure gradients are largest where the head-disc spacing changes most rapidly. Therefore, by vertically contouring channel floors 286, channels 264, 274 and 276 produce higher pressure gradients than would similar channels having non-vertically-contoured channels. As a result, vertically-contoured channels 264, 274 and 276 minimize the sensitivity of the pole tip fly height of slider 110 to manufacturing variations by providing higher damping capability. The vertically-contoured channels also provide slider 110 with improved take-off performance since then channels provide greater lift forces as lower disc speeds as compared to non-vertically contoured channels.

In addition, the vertically-contoured channels utilizes less air bearing real estate in order to generate an equivalent lift force, given the constraints of a typical slider surface area. Since channels 264, 274 and 276 produce greater lift forces with less surface area, more surface area on slider 110 is available to generate counter-acting suction forces. Larger suction force are generated by increasing the area of subambient pressure cavity 240. For example, in the embodiment shown in FIGS. 2 and 3, border walls 230 and 232 are made very narrow to maximize the size of cavity 240, since full-length rails are not required to produce sufficient lift. Also, border walls 230 and 232 wrap around bearing pads 252 and 254 to further increase the size of cavity 240.

This results in both larger lift forces and larger suction forces as compared to an air bearing slider having non-vertically contoured channels. These increases in lift and suction forces improve the contact stiffness of slider 110, which reduces manufacturing variation-induced pole tip fly height loss.

Figure 4:
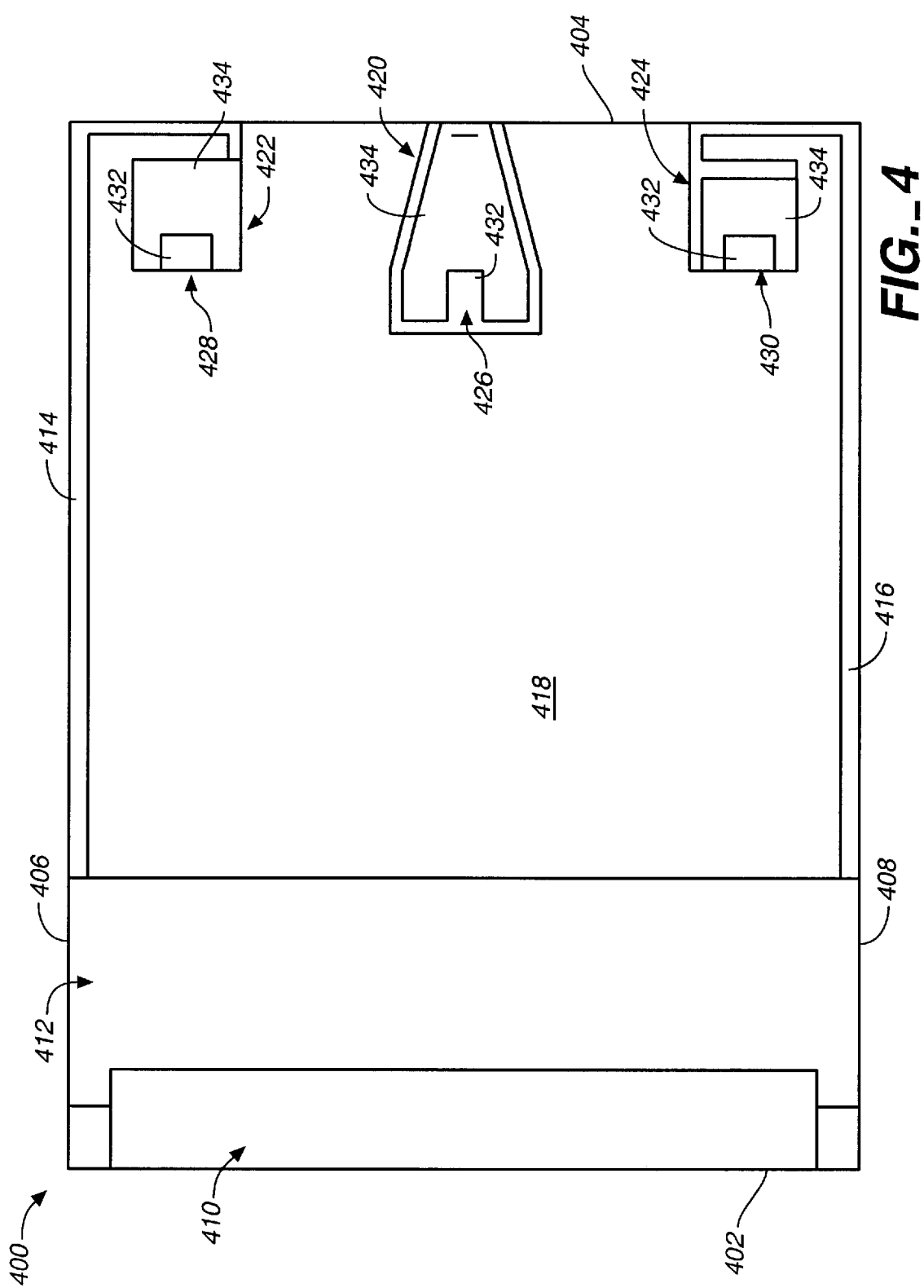
FIG. 4 is a bottom plan view of a slider having non-vertically-contoured convergent channels.

The performance of slider 110 (shown in FIGS. 2 and 3) was compared with the performance of slider 400 shown in FIG. 4, which has non-vertically-contoured convergent channels. Slider 400 is similar to slider 110 and includes a leading slider edge 402, a trailing slider edge 404 and slider side edges 406 and 408. Slider 400 further includes a leading taper 410, a cavity dam 412, border walls 414 and 416, subambient pressure cavity 418, center pad 420 and side pads 422 and 424. Pads 420, 422 and 424 include convergent channel features 426, 428 and 430, respectively. Channels 426, 428 and 430 each have a channel floor 432 which is recessed from and substantially parallel to bearing surfaces 434. Channel floors 432 are raised from the floor of subambient pressure cavity 418.

The fly attitude and stiffnesses of sliders 110 and 400 were simulated, and the results of the simulation is shown below in Table 1:

TABLE 1

|  | SLIDER 400 | SLIDER 110 |
| --- | --- | --- |
| PTFH (nm) | 11.8 | 12.0 |
| Pitch (urad) | 226 | 220 |
| Roll (urad) | 0.5 | 0.8 |

TABLE 1-continued

|  | SLIDER 400 | SLIDER 110 |
| --- | --- | --- |
| Kz (gmf/nm) | 0.14 | 0.19 |
| Kp (uN.M/urad) | 0.44 | 0.50 |
| Kc (mg/nm) | 60 | 76 |

As shown in Table I, slider 110 is observed to yield larger pitch stiffness, "Kp", vertical stiffness, "Kz", and contact stiffness, "Kc", than slider 400. For example, slider 110 generates 76 mg/nm in contact stiffness Kc as compared to 60 mg/nm generated by slider 400. This in turn results in lower sensitivity of the pole tip fly height to manufacturing variations. Additionally, dynamic computer simulation showed that slider 110 out performed slider 400 in terms of damping and take-off performance, due to its relatively larger pressurization at lower velocity. Larger pressurization at lower velocity enhances take-off performance. Slider 110 also generated higher pressure gradients, which increase damping. It should be noted that the values shown in Table 1 will change with changes in slider dimensions and with changes in bearing surface geometries or configurations in alternative embodiments of the present invention. These values are provided as examples only.

The vertically contoured channel floors can have a variety of different configurations in alternative embodiments of the present invention. FIGS. 5-1 through 5-14 are fragmentary, cross-sectional views of one of the channels, such as channel 264, taken along lines 5—5 of FIG. 2 according to various alternative embodiments of the present invention.

In FIG. 5-1, channel floor 286 has a first portion 286-1 that is generally parallel to subambient pressure cavity 240 and bearing surface 262 and a second portion 286-2 which is linearly tapered from first portion 286-1 to bearing surface 262. The depth of channel floor 286 relative to bearing surface 262 progressively decreases along portion 286-2 toward trailing channel end 282. In FIG. 5-2, channel floor 286 has a single portion which is linearly tapered through its entire length from subambient pressure cavity 240 to bearing surface 262. Therefore, the depth of channel floor 286 in this embodiment progressively decreases along the entire channel length from leading channel end 280 to trailing channel end 282.

In FIG. 5-3, first portion 286-1 is linearly tapered from subambient pressure cavity 240 to second portion 286-2. Second portion 286-2 is substantially parallel to and recessed from bearing surface 262 and ends in a step at trailing channel end 282.

In FIG. 54, channel floor 286 is linearly tapered from subambient pressure cavity 240 to trailing channel end 282, and has a step to bearing surface 262 at trailing channel end 282. In FIG. 5-5, channel floor 286 has first and second portions 286-1 and 286-2 which are similar to the configuration shown in FIG. 5-3. However, first portion 286-1 is contiguous with a leading taper 500 on the leading edge of the pad on which the channel is formed.

In the embodiments shown in FIGS. 5-6 through 5-13, channel floors 286 nave similar configurations as in FIGS. 5-1 through 5-5, but the tapered portions are formed of continuous or piece-wise curves of a single order or a higher order. Other vertically contoured configurations can also be used.

Also, the particular bearing geometry of the slider can have a variety of configurations in alternative embodiments of the present invention. The isolated bearing pads as shown in FIGS. 2 and 3 are shown as an example only.

FIG. 6 is a top plan view of a slider 600 having a different bearing configuration according to another alternative embodiment of the present invention. Slider 600 includes leading edge 602, trailing edge 604, slider side edges 606 and 608, cavity dam 610, subambient pressure cavity 612, side rails 614 and 616, and center rail 618. Side rails 614 and 616 each have a leading bearing surface 620, a trailing bearing surface 622 and a recessed step surface 624. Recessed step surface 624 is recessed from bearing surfaces 620 and 622 by the step depth of about 0.1 microns to about 0.3 microns, for example. Similarly, cavity dam 610 is recessed from bearing surfaces 620 and 622 by the step depth. Recessed step surfaces 624 and cavity dam 602 are generally parallel with bearing surfaces 620 and 622. Similarly, center rail 618 has a bearing surface 630 and leading and side step surfaces 632. Step surfaces 632 are parallel to and recessed from bearing surface 630 by the step depth. Subambient pressure cavity 612 is recessed from bearing surfaces 620, 622 and 630 by a cavity depth, which is greater than the step depth.

Convergent channel features 640, 642 and 644 are recessed within trailing bearing surfaces 622 and in bearing surface 630 of center rail 618. Channels 640, 642 and 644 have channel floors that are vertically contoured in a similar fashion as shown in FIGS. 5-1 through 5-14 such that the channel floors decrease in depth along all or part of their length from the channel end toward the trailing channel end. Channels 640 and 642 are open to fluid flow from recessed step surfaces 624, and channel 644 is open to fluid flow from recessed step surface 632 and cavity 612.

A variety of other air bearing surface geometries can also be used. For example, the vertically contoured convergent channel features can be used with positive pressure air bearing (PPAB) sliders having no cavity dam. Also, the convergent channel features can be positioned at various locations on the overall bearing surface for providing localized pressure gradients within the pressure profile between the slider and the disc surface. In one embodiment, the convergent channel features are located rearward of a midpoint along the length of the slider, as measured from the leading slider edge to the trailing slider edge.

In summary, one embodiment of the present invention is directed to a disc head slider 110, 600, which includes a slider body having a disc-opposing face 200 with leading and trailing slider edges 204, 206, 602, 604 and a slider length measured between the leading and trailing slider edges. The disc-opposing face 200 has a bearing surface 202, 214, 262, 270, 272, 620, 622, 630 and a recessed area 240, 612, 624 which is recessed from the bearing surface. A convergent channel 264, 274, 276, 640, 642, 644 is recessed within the bearing surface and has a leading channel end 280 open to fluid flow from the recessed area 240, 612, 624, channel side walls 284, a trailing channel end 282 closed to the fluid flow, a channel floor 286, and a channel length measured between the leading and trailing channel ends. The trailing channel end 282 is located rearward of a midpoint along the slider length and the channel floor 286 is vertically contoured relative to the bearing surface along at least a portion of the channel length.

Another embodiment of the present invention is directed to a disc drive assembly 100 which includes a disc 107 rotatable about a central axis 109 and a slider 110, 600 supported over the disc. The slider 110, 600 includes a slider body having a disc-opposing face 200 with leading and trailing slider edges 204, 206, 602, 604 and a slider length measured between the leading and trailing slider edges. The disc-opposing face has a bearing surface 202, 214, 262, 270, 272, 620, 622, 630 and a recessed area 240, 612, 624 which is recessed from the bearing surface. A convergent channel 264, 274, 276, 640, 642, 644 is recessed within the bearing surface and has a leading channel end 280 open to fluid flow from the recessed area, channel side walls 284, a trailing channel end 282 closed to the fluid flow, a channel floor 286 and a channel length measured between the leading and trailing channel ends. The trailing channel end 282 is located rearward of a midpoint along the slider length and the channel floor 286 is vertically contoured relative to the bearing surface along at least a portion of the channel length.

Yet another embodiment of the present invention is directed to a disc head slider 110, 600, which includes a disc opposing face having a bearing surface 202, 214, 262, 270, 272, 620, 622, 630 and a vertically contoured convergent channel 264, 274, 276, 640, 642, 644 for generating a positive pressure gradient along the bearing surface.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the slider while maintaining substantially the same functionality without departing from the scope and spirit of the present invention. In addition, although the preferred embodiment described herein is directed to a slider for a hard disc drive system, it will be appreciated by those skilled in the art that the teachings of the present invention can be applied to other systems, like floppy disc drives or other storage systems, without departing from the scope and spirit of the present invention.

What is claimed is:

1. A disc head slider comprising:

a slider body having a disc-opposing face with leading and trailing slider edges and a slider length measured between the leading and trailing slider edges;

a bearing surface defined on the disc-opposing face;

a recessed area formed within the disc-opposing face, which is recessed from the bearing surface; and a convergent channel recessed within the bearing surface and comprising a leading channel end open to fluid flow from the recessed area, channel side walls, a trailing channel end closed to the fluid flow, and a channel length measured between the leading and trailing channel ends, wherein the trailing channel end is located rearward of a midpoint along the slider length and the channel floor is vertically contoured relative to the bearing surface along at least a portion of the channel length and progressively decreases in depth along at least the portion of the channel length from the leading channel end toward the trailing channel end.

2. The disc head slider of claim 1 and further comprising:

a cavity dam; and a subambient pressure cavity positioned rearward of the cavity dam and at least partially forward of the convergent channel, wherein the subambient pressure cavity defines the recessed area and the leading channel end is open to the fluid flow from the subambient pressure cavity.

3. The disc head slider of claim 2 and further comprising:
an isolated bearing pad positioned generally along the trailing slider edge and having an upper surface which at least partially defines the bearing surface, wherein the convergent channel is recessed within a leading edge of the isolated bearing pad.

4. The disc head slider of claim 1 and further comprising:
first and second rails extending generally between the leading and trailing slider edges and having an upper surface which at least partially defines the bearing surface and a recessed step surface which is recessed from the upper surface; and
a central recess positioned between the first and second rails, wherein the convergent channel is recessed within the upper surface of one of the first and second rails and open to the fluid flow from the recessed step surface, and wherein the recessed step surface is raised relative to the central recess.

5. The disc head slider of claim 4 and further comprising:
a cavity dam extending transversely between the first and second rails, forward of the recessed area; and
a subambient pressure cavity, which trails the cavity dam between the first and second rails and defines the central recess.

6. The disc head slider of claim 1 wherein the channel floor has a cross sectional shape which is linearly tapered along at least a portion of the channel length.

7. The disc head slider of claim 1 wherein the channel floor has a cross sectional shape which is curvilinearly tapered along at least a portion of the channel length.

8. The disc head slider of claim 1 wherein the channel floor has a cross sectional shape which is rectilinearly tapered along at least a portion of the channel length.

9. The disc head slider of claim 1 wherein the channel floor has a cross sectional shape which has a plurality of steps that approximate a taper along at least a portion of the channel length.

10. A disc drive assembly comprising:
a disc rotatable about a central axis; and
a slider supported over the disc and comprising:
a slider body having a disc-opposing face with leading and trailing slider edges and a slider length measured between the leading and trailing slider edges;
a bearing surface defined on the disc-opposing face;
a recessed area formed within the disc-opposing face, which is recessed from the bearing surface; and
a convergent channel recessed within the bearing surface and comprising a leading channel end open to fluid flow from the recessed area, channel side walls, a trailing channel end closed to the fluid flow, and a channel length measured between the leading and trailing channel ends, wherein the trailing channel end is located rearward of a midpoint along the slider length and the channel floor is vertically contoured relative to the bearing surface along at least a portion of the channel length and progressively decreases in depth along at least the portion of the channel length from the leading channel end toward the trailing channel end.

11. The disc drive assembly of claim 10 and further comprising:
a cavity dam;
a subambient pressure cavity positioned rearward of the cavity dam and at least partially forward of the convergent channel, wherein the subambient pressure cavity defines the recessed area and the leading channel end is open to the fluid flow from the subambient pressure cavity.

12. The disc drive assembly of claim 11 and further comprising:
an isolated bearing pad positioned generally along the trailing slider edge and having an upper surface which at least partially defines the bearing surface, wherein the convergent channel is recessed within a leading edge of the isolated bearing pad.

13. The disc drive assembly of claim 10 and further comprising:
first and second rails extending generally between the leading and trailing slider edges and having an upper surface which at least partially defines the bearing surface and a recessed step surface which is recessed from the upper surface; and
a central recess positioned between the first and second rails, wherein the convergent channel is recessed within the upper surface of one of the first and second rails and open to the fluid flow from the recessed step surface, and wherein the recessed step surface is raised relative to the central recess.

14. The disc drive assembly of claim 10 wherein the channel floor has a cross sectional shape which is linearly tapered along at least a portion of the channel length.

15. The disc drive assembly of claim 10 wherein the channel floor has a cross sectional shape which is curvilinearly tapered along at least a portion of the channel length.

16. The disc drive assembly of claim 10 wherein the channel floor has a cross sectional shape which is rectilinearly tapered along at least a portion of the channel length.

17. The disc drive assembly of claim 10 wherein the channel floor has a cross sectional shape which has a plurality of steps that approximate a taper along at least a portion of the channel length.

18. A disc head slider comprising:
a disc opposing face having a bearing surface; and
vertically contoured convergent channel means recessed within the bearing surface and having a trailing channel end that is closed to fluid flow within the channel for generating a positive pressure gradient along the bearing surface rearward of the trailing channel end, wherein the channel means progressively decreases in depth relative to the bearing surface along at least the portion of the channel means, in a direction of the fluid flow, between the leading channel end and the trailing channel end.

* * * * *

UNITED STATES PATENT AND TRADEMARK OFFICE
CERTIFICATE OF CORRECTION

PATENT NO. : 6,587,308 B2
DATED : July 1, 2003
INVENTOR(S) : Sannino et al.

It is certified that error appears in the above-identified patent and that said Letters Patent is hereby corrected as shown below:

<u>Title page,</u>
Item [73], Assignee: please change "Seagate Technology, LLC" to -- Seagate Technology LLC --.

Signed and Sealed this

Twenty-first Day of October, 2003

JAMES E. ROGAN
*Director of the United States Patent and Trademark Office*